US010963769B2

(12) United States Patent
Mongrenier et al.

(10) Patent No.: US 10,963,769 B2
(45) Date of Patent: *Mar. 30, 2021

(54) LABEL INCLUDING AN ELECTRONIC CHIP FOR A BARREL AND ASSOCIATED PRODUCTION METHOD

(71) Applicant: WID GROUP, Bernay (FR)

(72) Inventors: Alexandre Mongrenier, Manneville-sur-Risle (FR); Benoît Sudre, Gif sur Yvette (FR)

(73) Assignee: WID Group, Bernay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,280

(22) Filed: May 7, 2020

(65) Prior Publication Data
US 2020/0265286 A1    Aug. 20, 2020

Related U.S. Application Data

(63) Continuation of application No. 16/482,647, filed as application No. PCT/EP2018/052317 on Jan. 30, 2018, now Pat. No. 10,719,753.

(30) Foreign Application Priority Data

Feb. 1, 2017  (FR) ..................... 1750836

(51) Int. Cl.
*G06K 19/077*    (2006.01)

(52) U.S. Cl.
CPC ... *G06K 19/07722* (2013.01); *G06K 19/0776* (2013.01); *G06K 19/07716* (2013.01)

(58) Field of Classification Search
None
See application file for complete search history.

(56) References Cited

U.S. PATENT DOCUMENTS

| 10,192,160 B2 | 1/2019 | Loussert et al. |
| 10,719,753 B2 * | 7/2020 | Mongrenier ....... G06K 19/0776 |
| 2003/0132302 A1 | 7/2003 | Hattori |
| 2010/0052859 A1 | 3/2010 | Lossau |

(Continued)

FOREIGN PATENT DOCUMENTS

| CN | 204390270 U | 6/2015 |
| WO | WO 2012/053716 A1 | 4/2012 |

OTHER PUBLICATIONS

International Search Report for PCT Application No. PCT/EP2018/052317, dated Jun. 6, 2018 in 6 pages.

(Continued)

*Primary Examiner* — Kristy A Haupt
(74) *Attorney, Agent, or Firm* — Knobbe, Martens, Olson & Bear, LLP

(57) ABSTRACT

A label is applied to a barrel containing liquid. The label includes an electronic chip, which includes a first layer as a support layer, a second layer as an electronic chip layer, and a third layer as a customization layer. The electronic chip layer includes at least an electronic chip and an antenna connected to the electronic chip. The customization layer includes at least one metal sublayer made of a metal material. Each of the layers has two faces, and the three layers are placed one above the other in a stacking direction. The thickness of the metal sublayer along the stacking direction is less than or equal to 35 μm.

12 Claims, 2 Drawing Sheets

(56) References Cited

U.S. PATENT DOCUMENTS

2011/0253715 A1 10/2011 Phaneuf et al.
2015/0108221 A1 4/2015 Akamatsu et al.

OTHER PUBLICATIONS

French Search Report for Application No. FR1750836, dated Nov. 21, 2017 in 2 pages.
Notice of Allowance for U.S. Appl. No. 16/482,647, dated Mar. 17, 2020 in 13 pages.

* cited by examiner

LABEL INCLUDING AN ELECTRONIC CHIP FOR A BARREL AND ASSOCIATED PRODUCTION METHOD

CROSS-REFERENCE TO RELATED APPLICATIONS

This application is a continuation of U.S. application Ser. No. 16/482,647, filed on Jul. 31, 2019 as the U.S. National Phase under 35. U.S.C. § 371 of International Application PCT/EP2018/052317, filed Jan. 30, 2018, which claims priority to French Patent Application No. 17 50836, filed Feb. 1, 2017. The disclosures of the above-described applications are hereby incorporated by reference in their entirety.

FIELD OF THE INVENTION

The present invention relates to a label comprising an electronic chip. The invention also relates to an alcoholic beverage container bearing such a label, an assembly including an alcoholic beverage container and such a label, as well as a method for manufacturing the label.

BACKGROUND OF THE INVENTION

In the food or cosmetic field, electronic chips are commonly used to make it possible to guarantee the traceability of products. The electronic chips are then generally affixed on the containers of such products.

For some products, in particular in the luxury field such as wines, it is desirable for the electronic chip not to be very visible, the presence thereof decreasing the value of the product.

To that end, it is known to position the electronic chip in an inaccessible location, for example behind a label of a bottle, which makes it possible to preserve the value of the content of the bottle.

However, a potential infringer does not know that the electronic chip is present and may be tempted to propose a counterfeit bottle, thinking that the bottle is not truly protected. The dissuasive aspect of the electronic chip is thus lost.

There is therefore a need for an electronic chip that is visible to a potential infringer but not highly visible to a consumer.

SUMMARY OF THE INVENTION

To that end, the present description in particular relates to a label comprising an electronic chip intended to be applied on a barrel, in particular an alcoholic beverage, the label including a first layer, called support layer, a second layer, called electronic chip layer, comprising at least an electronic chip and an antenna connected to the electronic chip, the electronic chip layer including a first face in contact with the support layer and a second face opposite the first face, and a third layer, called customization layer, having a first face in contact with the second face of the electronic chip layer and a second face opposite the first face of the customization layer, in which each layer has two faces and the three layers are superimposed in the stacking direction, and in which the customization layer comprises at least one sublayer, called metal sublayer, made of a metal material, the thickness of the metal sublayer along the stacking direction being less than or equal to 35 micrometers.

According to specific embodiments, the label with an electronic chip comprises one or more of the following features, considered alone or according to all technically possible combinations:

the metal material is silver or aluminum.
the label includes a protection layer in contact with the second face of the customization layer, the protection layer comprising at least a covering sublayer allowing a user to see the customization layer through the covering sublayer.
the customization layer further comprises an interfacing sublayer made from polyethylene terephthalate, the interfacing sublayer being in contact on the one hand with the electronic chip layer and on the other hand with the metal sublayer.
the customization layer has a decorative sublayer intended to give the user the visual impression that the label is decorated.

The present description also describes a barrel of liquid, in particular alcoholic beverage, having a surface on which the label is glued.

The present description also describes an assembly including a barrel of liquid, in particular alcoholic beverage, and a label, in which the bottle of liquid has a surface having a first color visible to a user, and in which the decorative sublayer of the customization layer of the label also has a second color visible to the user, the first and second visible colors being identical.

The present description also describes a method for manufacturing the label as previously described, the method including at least the following steps: providing a substrate; etching an electronic chip and an antenna on the substrate to form a layer with an electronic chip; depositing a customization layer on the electronic chip layer in the stacking direction to form a sandwich, and depositing the sandwich on a support layer in the stacking direction to form a multilayer structure.

BRIEF DESCRIPTION OF THE DRAWINGS

Other features and advantages of the invention will appear upon reading the following description of embodiments of the invention, provided as an example only and in reference to the drawings, which are.

DETAILED DESCRIPTION OF THE PREFERRED EMBODIMENTS

Figure 1:
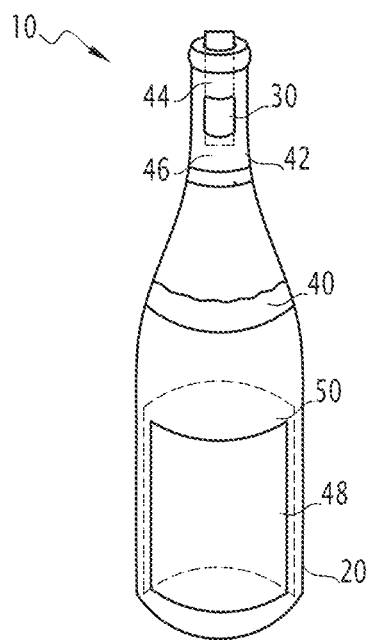
FIG. 1, a schematic view of an example assembly including a bottle of alcoholic beverage and an electronic chip label, the bottle being provided with the electronic chip label, FIG. 2, a schematic view of the electronic chip label of FIG. 1, FIG. 3, a schematic view of a protective layer of the electronic chip label of FIG. 1, and FIG. 4, a schematic view of another exemplary assembly including a barrel of alcoholic beverage provided with an electronic chip label.

An assembly 10 including a bottle 20 of alcoholic beverage and a label comprising an electronic chip 30 is shown in FIG. 1.

The bottle 20 of alcoholic beverage is a first container of alcoholic beverage.

The bottle 20 is provided with the label comprising an electronic chip 30 in order to identify the bottle.

The bottle 20 contains a liquid substance 40.

According to the proposed example, the liquid substance 40 is wine.

In a variant, the liquid substance 40 is alcohol.

According to another variant, the liquid substance 40 is spirits.

In these three cases, the bottle 20 is a bottle of alcoholic beverage.

According to another embodiment, the bottle 20 is a bottle of perfume.

In each of these cases, the bottle 20 is a bottle of liquid.

The bottle is made from glass.

According to a variant, the bottle is made from plastic.

The bottle 20 has a barrel, a bottom, a shoulder and a neck.

The barrel is the main and widest part of the bottle 20. The barrel is sometimes referred to using the expression "body".

The bottom closes the barrel so that the bottle 20 can be placed easily on a flat surface. Depending on the case, the bottom is flat, sloped (convex) or semi-sloped.

The shoulder is the flared part that connects the neck to the barrel.

The neck corresponds to the slender part at the apex. The neck delimits a space usually called throat 42.

The throat 42 generally comprises a collar protruding relative to the outer surface of the throat 42 and offset relative to the upper end of the throat 44.

A stopper 44 is inserted into the throat 42.

A sealing capsule 46 tops the stopper 44.

A sealing capsule 46 is generally made from metal (tin or aluminum) and comprises a skirt that extends from the upper end of the throat 42 over a certain height, from about 5 cm to 6 cm. Thus, the lower edge of the sealing capsule 46 is offset downward relative to the collar by a distance of about 3 to 4 cm.

During the opening of the bottle 20, the sealing capsule 46 is cut using a sharp tool along a cutting line positioned just above the collar. After such cutting, the upper part of the sealing capsule 46 is removed to make it possible to remove the stopper 44. The lower part of the sealing capsule 46 in the form of a sleeve is kept on the bottle 20.

A label 48 and a counter-label 50 are affixed on the body.

The label 48 is sometimes described as "main label".

According to the example of FIG. 1, the label comprising an electronic chip 30 is affixed on the skirt of the sealing capsule 46.

The skirt of the sealing capsule 46 defines a surface of the bottle 20 having a first color visible to a user.

For example, the first visible color is red.

In the remainder of the description, the label comprising an electronic chip 30 is called chip 30. The terms "tag" or "electronic module" are sometimes also used to designate the label comprising an electronic chip 30.

Nevertheless, other locations for the chip 30 can also be considered.

For example, on the neck of the bottle, the barrel of the bottle, on the main label 48, or on the stopper of the bottle.

Figure 2:
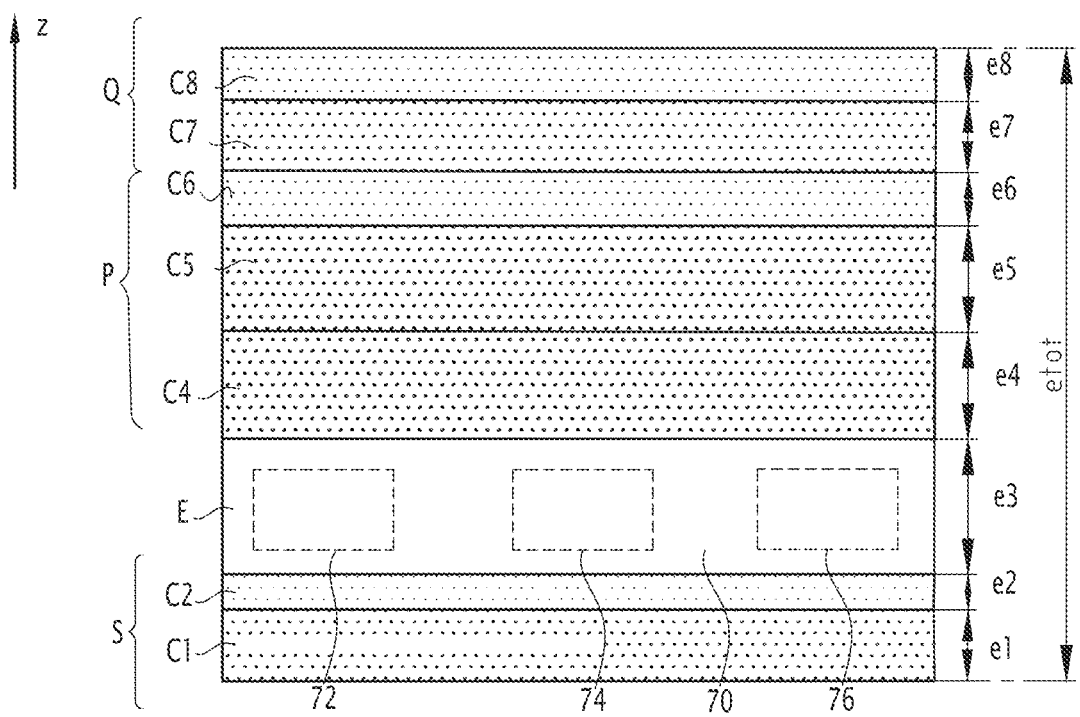

The chip 30 is shown in FIG. 2.

The chip 30 has a cylindrical shape, the base of which is rectangular with rounded edges. Thus defined for the chip are two large sides and two small sides, parallel to each other and perpendicular to the large sides, while the two large sides are parallel to each other.

According to the proposed example, a large side has a size of 35 mm (millimeters) and a small side has a size of 21 mm.

The four edges are identical and rounded.

In a variant, the chip 30 has another shape.

For example, the base of the chip 30 has a square shape.

According to another example, the base of the chip 30 has an oval shape.

The chip 30 shown in FIG. 2 has a multilayer structure. The expression "multilayer" indicates that the chip is formed by a set of layers superimposed in a direction called stacking direction Z.

The stacking direction is symbolized by an axis Z in FIG. 2. In the remainder of the description, the stacking direction is denoted stacking direction Z.

Furthermore, hereinafter, the size of an object in the stacking direction Z is called thickness.

The chip 30 has a total thickness $e_{tot}$.

The total thickness $e_{tot}$ is equal to the sum of the thicknesses of each layer forming the chip.

The total thickness $e_{tot}$ is less than or equal to 0.3 mm.

The total thickness $e_{tot}$ of the chip is for example comprised between 200 μm and 300 μm (microns).

The expression "comprised" is to be understood broadly. Thus, a property A is comprised between a first value A1 and a second value A2 when, on the one hand, the property A is greater than or equal to the first value A1 and, on the other hand, the property A is less than or equal to the second value A2.

In the described example, the chip 30 includes four layers S, E, P, Q.

Each layer S, E, P, Q is a planar layer.

Each layer S, E, P, Q has two faces.

In the described example, the faces of each layer S, E, P, Q are parallel to each other.

The layers S, P, Q include sublayers C1, C2, C4, C5, C6, C7, C8.

Each sublayer C1, C2, C4, C5, C6, C7, C8 is a planar sublayer.

Each sublayer C1, C2, C4, C5, C6, C7, C8 has two faces.

In the described example, the faces are parallel to each other.

In the described example, the faces are also identical.

Each layer S, E, P, Q has a cylindrical shape having the same base as the chip 30.

In the case at hand, the base of each layer S, E, P, Q has a rectangular shape with rounded edges.

The four layers S, E, P, Q of the chip 30 are kept together by a glue.

The glue is for example a thermofusible glue.

The chip 30 includes a first layer, called support layer S, a second layer, called electronic chip layer E, a third layer, called customization layer P, and a fourth layer, called protection layer Q.

A top and a bottom are defined for the chip 30 in the stacking direction Z.

The support layer S is located toward the bottom. The protection layer Q is located toward the top.

In the remainder of the description, the layers S, E, P, Q are described in the stacking order of the layers, from the bottom toward the top, in the stacking direction Z.

The support layer S is able to support the other layers of the chip 30 and is able to connect the chip 30 to the bottle 20.

The support layer S includes a transfer sublayer C1 and an adhesive sublayer C2.

The transfer sublayer C1 is removable and intended to be removed during gluing of the chip 30 on the object to be identified.

The transfer sublayer C1 has a thickness $e_1$ less than or equal to 30 μm.

The thickness $e_1$ of the transfer sublayer C1 is for example comprised between 5 μm and 25 μm.

According to one specific embodiment, the thickness $e_1$ of the transfer sublayer C1 is comprised between 15 μm and 25 μm.

In the specific case of FIG. 2, the thickness $e_1$ of the transfer sublayer C1 is equal to 20 μm.

The transfer sublayer C1 is for example made from

The adhesive sublayer C2 is able to make it possible to glue the chip 32 on a surface.

The adhesive sublayer C2 has a thickness $e_2$ less than or equal to 30 μm.

The thickness $e_2$ of the adhesive sublayer C2 is for example comprised between 5 μm and 25 μm.

According to one particular embodiment, the thickness $e_2$ of the adhesive sublayer C2 is comprised between 5 μm and 15 μm.

In the specific case of FIG. 2, the thickness $e_2$ of the adhesive sublayer C2 is equal to 10 μm.

The adhesive sublayer C2 is made from an adhesive material.

The adhesive material is able to adhere to a flat, convex or concave surface.

The electronic chip layer E includes a substrate 70, a microprocessor 72, a memory 74 and an antenna 76.

The first face of the electronic chip layer E is in contact with the support layer S.

In particular, the first face of the electronic chip layer E is in contact with the adhesive sublayer C2 of the support layer S.

The second face of the electronic chip layer E is in contact with the customization layer P.

The electronic chip layer E has a thickness $e_3$ less than or equal to 50 μm.

The substrate 70 is for example made from silicon.

The microprocessor 72, the memory 74 and the antenna 76 are etched on the substrate 70.

The microprocessor 72 is able to interact with the antenna 76 to exchange signals.

The memory 74 is able to store information.

The assembly of the microprocessor 72 and the memory 74 forms the electronic part strictly speaking. Such an electronic part is sometimes called "electronic microchip" in reference to the area occupied by the assembly, which is smaller than 1 mm².

The first face of the customization layer P is in contact with the second face of the electronic chip layer E.

The second face of the customization layer P is in contact with the protection layer Q.

The customization layer P comprises an interfacing sublayer C4, a metal sublayer C5 and a decorative sublayer C6 that are superimposed in the stacking direction.

The interfacing sublayer C4 is able to produce an interface between the electronic chip layer E on the one hand and the metal sublayer C5 on the other hand.

The interfacing sublayer C4 is in contact on the one hand with the electronic chip layer E and on the other hand with the metal sublayer C4.

The interfacing sublayer C4 has a thickness $e_4$ less than or equal to 50 μm. According to one specific embodiment, the thickness $e_4$ of the interfacing sublayer C4 is comprised between 25 μm and 35 μm.

In the specific case of FIG. 2, the thickness $e_4$ of the interfacing sublayer C4 is equal to 30 μm.

The interfacing sublayer C4 is made from polyethylene terephthalate (PET).

The metal sublayer C5 has a thickness $e_5$ less than or equal to 35 μm.

According to one specific embodiment, the thickness $e_5$ of the metal sublayer C5 is comprised between 25 μm and 35 μm.

In the specific case of FIG. 2, the thickness $e_5$ of the metal sublayer C5 is equal to 30 μm.

The metal sublayer C5 is made from a metal material.

According to the described example, the metal material is silver.

According to one variant, the metal material is a silver-based alloy.

According to still another embodiment, the metal material is aluminum.

According to one variant, the metal material is an aluminum- and/or silver-based alloy. The decorative sublayer C6 has a thickness $e_6$ less than or equal to 20 μm.

According to one specific embodiment, the thickness $e_8$ of the decorative sublayer C6 is comprised between 10 μm and 20 μm.

In the specific case of FIG. 2, the thickness $e_8$ of the decorative sublayer C6 is equal to 15 μm.

According to the proposed example, the decorative sublayer C6 is an ink shade.

The decorative sublayer C6 has a second color visible to the user.

In the described example, the second visible color is also red.

The first visible color of the surface of the bottle 20 defined by the skirt of the sealing capsule 46 and the second visible color of the decorative sublayer C6 are preferably identical.

According to a variant, the customization layer P has no decorative sublayer C6.

Figure 3:
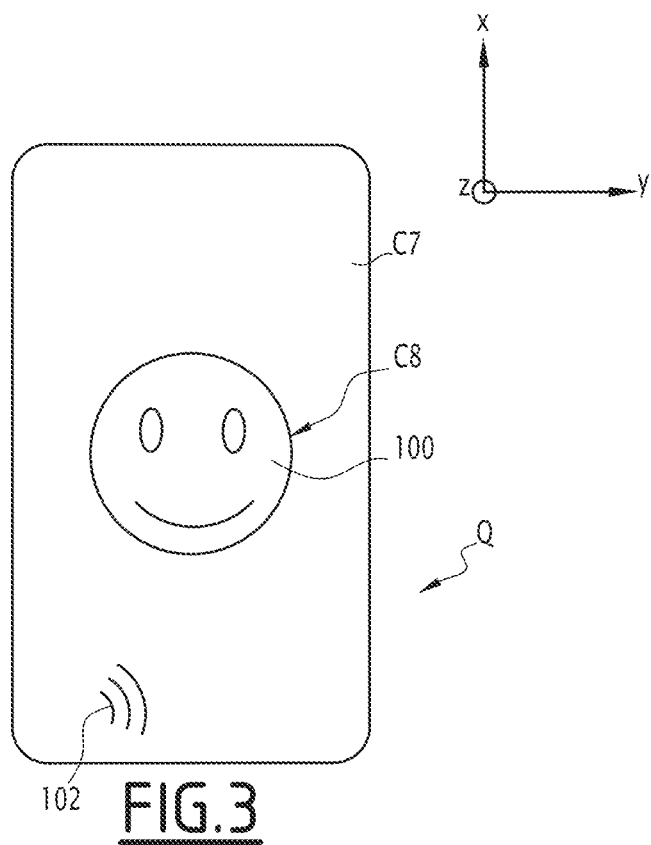

The protective layer Q is shown in FIG. 3.

The protective layer Q has two large sides and two small sides.

The two large sides extend along a longitudinal direction X perpendicular to the stacking direction Z.

The two small sides extend along a transverse direction Y perpendicular to the longitudinal direction X and the stacking direction Z.

The protective layer Q is able to protect the other layers of the chip 30.

The protective layer Q is in contact with the second face of the customization layer P. The protective layer Q comprises a covering sublayer C7 and an ornamentation sublayer C8.

The covering sublayer C7 is able to protect the other layers and to allow the passage of at least 80% of the wavelengths visible by the user through the covering sublayer C7.

The covering sublayer C7 defines a surface in the longitudinal X and transverse Y directions.

The covering sublayer C7 has a thickness $e_7$ less than or equal to 30 μm.

According to one specific embodiment, the thickness $e_7$ of the covering sublayer C7 is comprised between 15 μm and 25 μm.

In the specific case of FIG. 2, the thickness $e_7$ of the covering sublayer C7 is equal to 20 μm.

The covering sublayer C7 is for example made from polypropylene (PP).

The ornamental sublayer C8 forms a first pattern 100 and a second pattern 102 that are in particular visible in FIG. 3.

The first pattern 100 for example comprises a distinctive sign.

The second pattern 102 for example comprises an icon indicating a communication protocol.

The ornamental sublayer C8 defines a surface in the longitudinal X and transverse Y directions.

The surface of the ornamental sublayer C8 is less than or equal to 75% of the surface of the covering sublayer C7.

Preferably, the surface of the ornamental sublayer C8 is less than or equal to 50% of the surface of the covering sublayer C7.

It is thus understood that a user sees the customization layer P by looking through the protection layer Q.

The ornamental sublayer C8 has a thickness $e_8$ less than or equal to 20 μm.

According to one specific embodiment, the thickness $e_8$ of the ornamental sublayer C8 is comprised between 10 μm and 20 μm.

In the specific case of FIG. 2, the thickness $e_8$ of the ornamental sublayer C8 is equal to 15 μm.

The ornamental sublayer C8 is for example made from ink.

According to one variant, the protection layer Q comprises the ornamental sublayer C8 and the covering sublayer C7 from bottom to top in the stacking direction Z.

The operation of the chip 30 is now described.

The chip 30 is intended to be used by an end consumer.

The bottle of alcoholic beverage 20 having a sealing capsule 46 provided with the chip 30 is present on a display at a retailer or in a supermarket. The consumer wishing to purchase a bottle of alcoholic beverage at the retailer or in the supermarket finds the bottle 20.

The consumer sees the chip 30 that is visible on the bottle 20. The visual appearance of the chip 30 is connected to the visual appearance of the sealing capsule 46 to which the chip 30 is glued. The consumer does not see the electronic chip layer E of the chip 30. Thus, the consumer has the visual impression that the chip 30 is a simple label.

The consumer therefore considers that there is no depreciation of the product contained in the bottle.

However, any potential infringer sees the second pattern 102 of the ornamental sublayer C8 indicating a communication protocol and thus the presence of an electronic chip.

The potential infringer can read, using an electronic chip reader, for example a wireless mobile telephone, information stored in the memory 74 of the chip 30.

Indeed, the chip 12 is associated with information that the memory 74 of the chip 30 stores.

For example, the memory 74 of the chip 30 stores information relative to the profile of the wine that the bottle 20 contains.

For example, the memory 74 of the chip 30 stores information relative to the appellation of the wine, i.e., the name given to the wine.

According to another example, the memory 74 stores information relative to the vintage, i.e., the harvest year of the grape used to produce the wine.

According to another example, the memory 74 of the chip 30 stores information relative to the varietal(s) of the grape used to produce the wine, the pairings that can be done with the wine contained in the bottle 20, the tank that the wine contained in the bottle 20 comes from.

According to another example, the memory 74 of the chip 30 stores information relative to the production site, an identifier of the bottle 20, an identifier of the producer of the bottle 20, the name of the profile of the bottle 20, bottling date and time data, production output date and time data.

According to the described example, the chip 30 is an NFC (Near Field Communication) module, allowing near-field reading (with a maximum distance of about 4 cm between the chip 30 of the bottle 20 and an electronic chip reader).

The communication protocol is then of the near field communication type of the NFC type defined according to the standards recognized by the NFC Forum, including standards ISO/CEI 14443-1 to ISO/CEI 14443/4.

It should be noted that the NFC standard is a wireless communication standard (called near field communication or NFC communication) making it possible for the electronic communication chips to communicate with a very large number of apparatuses, in particular wireless mobile telephones.

The infringer is then not tempted to copy the product. The dissuasive aspect of the electronic chip 30 is thus preserved.

The electronic chip 30 is thus visible to a potential infringer but not highly visible to a consumer.

Furthermore, such an electronic chip 30 has the advantage that the total thickness $e_{tot}$ is less than 0.3 millimeters, i.e., small, which guarantees good discretion.

It should be noted that the decorative sublayer C6 gives a user the visual impression that the label is decorated.

Furthermore, the electronic chip 30 allows radio waves to pass for reading of the information stored in the memory 74 despite the presence of a metal material.

Lastly, the chip 30 has resistance properties relative to humidity and holding on the material.

The chip 30 also makes it possible to ensure optimal traceability of the bottle 20 and the alcoholic beverage contained in the bottle 20 and thus to avoid infringements.

Furthermore, the chip 30 is flexible, and is therefore capable of supporting a fast labeling pace and perfectly marrying the shape of the bottle 20 on which the chip 30 is affixed.

Of course, depending on the applications, the chip 30 is easily customizable, which opens up possibilities that the chips 30 of the state of the art did not have.

For example, unlike the proposed issue, a manufacturer could wish for the chip 30 to be very visible and make it a marketing argument.

This ease of customization comes from the fact that the chip 30 has the advantage of being easy to manufacture.

To illustrate this simplicity, an example manufacturing method of the chip 30 is now described.

A substrate 70 is provided.

A microprocessor 72, a memory 74 and an antenna 76 are etched on the substrate 70 to form the electronic chip layer E.

The decorative sublayer C6 and the ornamental sublayer C8 are made by a screenprinting technique.

According to the variants, the decorative sublayer C6 and the ornamental sublayer C8 are made by a thermal printing, inkjet printing, transfer printing, laser printing, offset printing, flexography, rotogravure technique.

The screenprinting is followed by a drying step by ultraviolet radiation.

The layers are next deposited one on top of the other so as to form the assembly of layers that leads to obtaining the chip 30.

The assembly of layers is for example made by a deposition technique according to a deposition technique of the state of the art.

The deposition can be manual or robotic.

Thus, the manufacturing method comprises a step for depositing a customization layer P on the electronic chip layer E in the stacking direction to form a sandwich PE.

The manufacturing method comprises a step for depositing the sandwich PE on a support layer S in the stacking direction.

The manufacturing method further comprises a step for depositing a protective layer Q on the second face of the customization layer to form a multilayer structure.

The chip 30 can be manufactured by a label manufacturer.

Prior to the placement of the chip 30 on the bottle 20, the transfer sublayer C1 is removed. The chip 30 is glued using the adhesive sublayer C2 on the sealing capsule 46.

The placement of the chip 30 on the bottle 20 can be done during the bottling using a machine for depositing labels.

The proposed manufacturing method is easy to establish, such that the chip 30 becomes infinitely customizable.

Other applications can also be considered for the assembly formed by the container and the chip 30.

In particular, the liquid container, in the case at hand alcoholic beverage, can be different.

Figure 4:
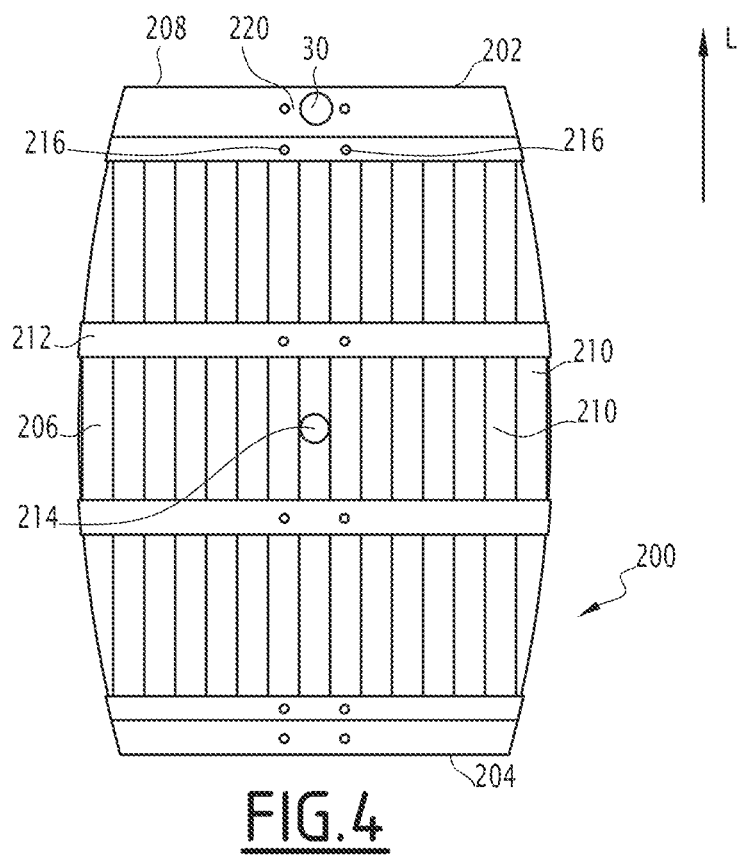

According to one example, the alcoholic beverage container is an alcoholic beverage barrel 200 in reference to FIG. 4.

The barrel 200 is provided with the label comprising an electronic chip 30 in order to identify the barrel.

"Barrel" refers to any container including staves.

For example, a keg, a quartaut, a cask, a tank, a jar or a tun are considered in the context of the present description to be barrels.

The barrel 200 includes a wall having an inner face and an outer face.

The inner face is a closed surface such that the inner face delimits an inner volume of the barrel 200.

The barrel 200 isolates the inner volume from the outside of the barrel 200.

According to the described example, the inner volume is intended to receive an alcoholic beverage.

In the case at hand, the inner volume contains wine.

According to other examples, the inner volume includes a spirit or juice.

Usually, the inner volume includes a beverage, such that the barrel 200 is a liquid barrel, and more specifically a beverage barrel.

The inner volume has a capacity that can be expressed in particular in liters.

The capacity of the inner volume is the capacity of the barrel 200.

For example, the capacity is comprised between 1 and 1500 liters.

According to one example, the capacity is comprised between 100 liters and 600 liters, preferably between 100 and 400 liters.

According to the described example, the barrel 200 has a capacity of 228 liters.

The outer face of the wall gives a shape to the barrel 200.

The barrel 200 has an axis of symmetry making it possible to define a longitudinal direction. The longitudinal direction is symbolized by an axis L in FIG. 4. The longitudinal direction is thus denoted longitudinal direction L in the remainder of the description.

The barrel 200 extends along the longitudinal direction L between a first end 202 and a second end 204.

The distance between the first end 202 and the second end 204 of the barrel 200 defines the length of the barrel 200.

The length of the barrel 200 is several meters.

In each plane perpendicular to the longitudinal direction L, the section of the barrel 200 has the same geometric shape.

According to the example of FIG. 4, the geometric shape is a disc for which a radius is defined.

When the sections of the barrel 200 are traveled from the first end 202 toward the second end 204, the radius of the section increases from a first minimum radius up to a maximum radius, then decreases to a second minimum radius.

The first minimum radius is equal to the second minimum radius.

In such a configuration, the maximum radius is reached a point corresponding to the center of the barrel 200.

The ratio between the minimum radius and the maximum radius is greater than or equal to 80% such that the barrel 200 has a slightly curved cylindrical shape at the center.

The wall of the barrel 200 includes three parts: a lateral wall 206 and two bottoms 208.

The lateral wall 206 is formed by two staves 210 assembled by hoops 212.

The staves 210 are boards.

The staves 210 extend between the first end 202 of the barrel 200 and the second end 204 of the barrel 200.

The staves 210 are for example made from wood.

According to another example, the staves 210 are made from plastic, ceramic or stainless steel.

As shown in FIG. 4, the staves 210 delimit a bung hole 214.

The bung hole 214 is a through hole intended to be plugged by a bung.

The bung hole 214 allows an operator to monitor the barrel 200.

Each hoop 212 is a maintaining hoop. The hoops 212 provide the assembly and maintenance of the staves 210 in position.

Each hoop 212 is positioned parallel to the bottoms 208, i.e., perpendicular to the longitudinal direction L.

Each hoop 212 has a complete annular shape for which a perimeter is defined.

This means that the hoop surrounds the staves 210 continuously.

To that end, the hoops 212 are fastened to the staves 210, for example by threaded fasteners.

The annular shape is specific, since the radius of the disc delimited by the hoop 212 evolves monotonously along the longitudinal direction L.

The annular shape extends along the longitudinal direction L between a first end and a second end. The distance between the ends along the longitudinal direction L is called length of the hoop 212.

The length of the hoop 212 is comprised between 3 centimeters and 7 centimeters.

Each hoop 212 is made from metal.

Each hoop 212 includes two posts 216.

The ratio between the distance between two posts 216 and the perimeter of a hoop 212 is less than or equal to 20% such that the two posts 216 are located near one another.

The two posts 216 delimit a space 220 between the two adjacent posts 216.

The space 220 defines a surface of the barrel 200 having a first color visible to a user.

The first visible color is for example gray.

In a variant, the number of posts 216 is different.

For example, the number of posts 216 is greater than or equal to three.

According to the described example, the barrel 200 has six hoops 212.

The six hoops 212 are positioned symmetrically relative to the center of the barrel 200.

In a variant, the number of hoops 212 is different.

For example, the number of hoops 212 is equal to two, four or eight.

In general, the number of hoops 212 is even to allow symmetrical positioning relative to the center of the barrel 200.

Each bottom 208 is a disc of equal radius, namely the minimum radius.

The first bottom 208 is the first end 202 of the barrel 200 while the second bottom 208 is the second end 204 of the barrel 200.

In the described example, the bottoms 208 are symmetrical relative to a plane normal to the longitudinal direction L and passing through the center of the barrel 200.

According to the example of FIG. 4, the chip 30 is located on a hoop 212.

In particular, the chip 30 is affixed on a space 220 of a hoop 212.

In a variant, the barrel 200 has no hoops 22. This is for example the case when the staves 210 are made from stainless steel.

According to this variant, the chip 30 is affixed, for example, on a stave 210 or on a bottom 208 of the barrel 200.

The chip 30 according to this embodiment is described hereinafter in terms of how it differs from the chip 30 of FIG. 2.

In particular, the chip 30 has a cylindrical shape, the base of which is a disc having a diameter.

According to the proposed example, the diameter of the disc is comprised between 20 millimeters and 30 millimeters.

Each layer S, E, P, Q has a cylindrical shape having the same base as the chip 30.

In a variant, the chip 30 has another shape.

For example, the base of the chip 30 has a rectangular shape.

According to this embodiment, the support layer S further includes a connecting sublayer.

The connecting sublayer provides for reading of the chip 30 on a surface made from metal.

The connecting sublayer is located between the adhesive sublayer C2 and the electronic chip layer (E) in the stacking direction.

The connecting sublayer has a thickness less than or equal to 30 µm.

The connecting sublayer is made from ferrite.

According to a variant, the connecting sublayer is made from a ferrite alloy.

The decorative sublayer C6 has a second color visible to the user.

According to the described example, the second visible color is gray.

The first visible color of the surface of the barrel 200 defined by the space 220 between the two posts 216 and the second visible color of the decorative sublayer C6 are preferably identical.

According to this embodiment, the protective layer Q has no ornamental sublayer C8.

The operation of the chip 30 is now described.

The alcoholic beverage barrel 200 having a surface provided with the chip 30 is present at a barrel manufacturer or at an owner implementing the aging of an alcoholic beverage in the barrel 200.

The visual appearance of the chip 30 is connected to the visual appearance of the space 220 defining a surface on which the chip 30 is glued. A user does not see the electronic part of the chip 30. Thus, the user has the visual impression that the chip 30 is missing.

During the transport of the barrel 200 between the barrel manufacturer and the owner as well as the property, the chip 30 is not torn away by an ill-intentioned user and can be used by an operator of the property.

The operator can read, using an electronic chip reader, information stored in the memory of the chip 30.

In this embodiment, the memory 74 of the chip 30 stores, for example, information relative to the pressure of the alcoholic beverage contained inside the barrel 200.

According to another example, the memory 74 stores information relative to the oxygenation of the alcoholic beverage contained in the barrel 200.

According to another example, the memory 74 of the chip 30 stores information relative to the manufacturing site of the barrel 200, an identifier of the barrel 200, an identifier of the manufacturer of the barrel 200, filling and emptying date and time information of the barrel 200.

Such a chip 30 has the advantage of being discrete and connecting with the surface on which it is affixed.

The chip 30 makes it possible to monitor the evolution of the alcoholic beverage as it ages without error, providing optimal traceability of the barrel 200 and the alcoholic beverage contained in the barrel 200, and thus preventing infringements.

The manufacturing of the chip 30 differs from the manufacturing described for the first embodiment in that it does not comprise a step for producing the ornamental sublayer C8.

The placement of the chip 30 on the barrel 200 can be done at the manufacturer of the barrel 200 or the property where the aging of the alcoholic beverage takes place in the barrel 200.

In all of the proposed embodiments, the electronic chip 30 can assume any desired colored appearance.

In particular, the alcoholic beverage container has a surface having a first color visible to a user, and in which the decorative sublayer C6 of the customization layer P of the label 30 also has a second visible color identical to the first visible color.

According to another specific embodiment, the chip 30 has an additional transparent protective layer in contact with the uppermost layer described in the previous embodiments.

Thus, for example, for the case of FIG. 2, the chip 30 has a ninth protective layer in contact with the eighth layer.

The transparent protective layer is for example adhesive and is glued on the uppermost layer.

The protective layer makes it possible to protect the screenprinting from damage and also makes it possible to have a brilliant or matte finish of the label 30 based on the material chosen to produce the protective layer.

In particular, a plastic is a plastic film having an overlay effect. In particular, the plastic is a plastic film used to produce plastic pouches able to contain documents.

According to one particular embodiment, the chip 30 affixed on a space 220 of the hoop 212 of the barrel 200 is an RFID tag, the RFID tag being able to be a label as previously described or a different label. The RFID tag comprises a microprocessor associated with an antenna allowing the exchange of signals. The microprocessor also includes a memory able to store information.

Such a chip 30 has the advantage that when the barrel 200 is moved by an operator rolling it on the ground, the chip 30 does not come into contact with the ground and its operation is therefore not altered.

The invention corresponds to any technically possible combination of the embodiments previously described.

What is claimed is:

1. A barrel containing liquid, said barrel having applied thereto a label comprising an electronic chip, the label including:
    a first layer, called support layer comprising two faces,
    a second layer, called electronic chip layer, comprising at least an electronic chip and an antenna connected to the electronic chip, the electronic chip layer including a first face in contact with the support layer and a second face opposite the first face, and
    a third layer, called customization layer, having a first face in contact with the second face of the electronic chip layer and a second face opposite the first face of the customization layer,
    wherein the three layers are superimposed in a stacking direction,
    and wherein the customization layer comprises at least one sublayer, called metal sublayer, made from a metal material, the metal sublayer having a thickness along the stacking direction being less than or equal to 35 micrometers.

2. The barrel of claim 1, wherein the liquid is an alcoholic beverage.

3. The barrel of claim 2, comprising a surface on which the label is glued.

4. The barrel of claim 1, wherein the label further comprises a protection layer in contact with the second face of the customization layer, the protection layer comprising at least a covering sublayer allowing a user to see the customization layer through the covering sublayer.

5. The barrel of claim 1, wherein the customization layer further comprises an interfacing sublayer made from polyethylene terephthalate, the interfacing sublayer being in contact on the one hand with the electronic chip layer and on the other hand with the metal sublayer.

6. The barrel of claim 1, wherein the customization layer comprises a decorative sublayer intended to give the user the visual impression that the label is decorated.

7. A method of labeling a barrel containing liquid, comprising applying to the barrel a label comprising an electronic chip, the label including:
    a first layer, called support layer comprising two faces,
    a second layer, called electronic chip layer, comprising at least an electronic chip and an antenna connected to the electronic chip, the electronic chip layer including a first face in contact with the support layer and a second face opposite the first face, and
    a third layer, called customization layer, having a first face in contact with the second face of the electronic chip layer and a second face opposite the first face of the customization layer,
    wherein the three layers are superimposed in a stacking direction,
    and wherein the customization layer comprises at least one sublayer, called metal sublayer, made from a metal material, the metal sublayer having a thickness along the stacking direction being less than or equal to 35 micrometers.

8. The method of claim 7, wherein the liquid is an alcoholic beverage.

9. The method of claim 8, wherein the label is applied to the barrel by glue.

10. The method of claim 7, wherein the label further comprises a protection layer in contact with the second face of the customization layer, the protection layer comprising at least a covering sublayer allowing a user to see the customization layer through the covering sublayer.

11. The method of claim 7, wherein the customization layer further comprises an interfacing sublayer made from polyethylene terephthalate, the interfacing sublayer being in contact on the one hand with the electronic chip layer and on the other hand with the metal sublayer.

12. The method of claim 7, wherein the customization layer comprises a decorative sublayer intended to give the user the visual impression that the label is decorated.

* * * * *